Patented Nov. 10, 1931

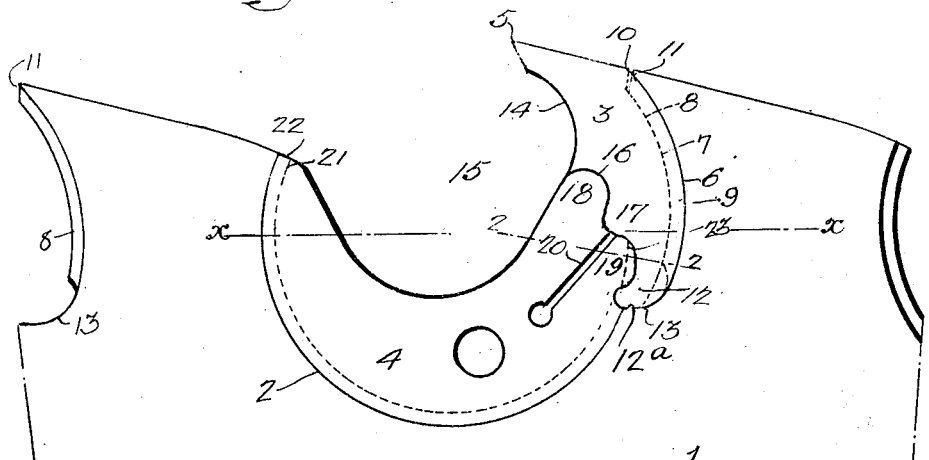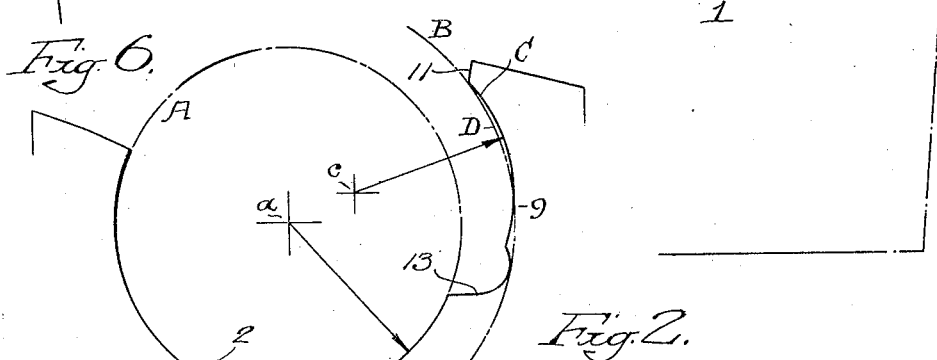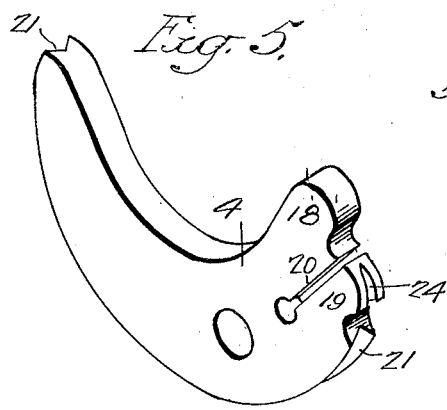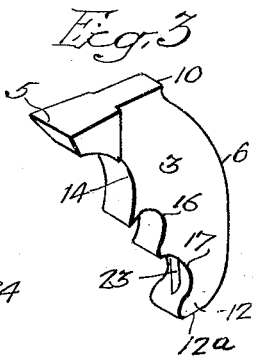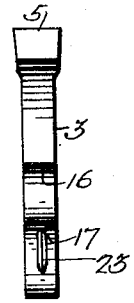

1,831,705

UNITED STATES PATENT OFFICE

SAMUEL T. FREAS, OF TRENTON, NEW JERSEY, ASSIGNOR TO HENRY DISSTON & SONS, INCORPORATED, OF TACONY, PENNSYLVANIA, A CORPORATION OF PENNSYLVANIA

INSERTABLE TOOTH SAW

Application filed December 3, 1930. Serial No. 499,803.

My invention relates to certain improvements in insertable tooth saws, in which the attachable tooth is held in the blade of the saw by a segmental retainer.

One object of the invention is to hold the tooth firmly in position, preventing any lateral movement of the tooth.

A further object of the invention is to lock the tooth not only to the body of the saw but also to the segmental retainer, holding the tooth in absolute alignment.

In the accompanying drawings:

Fig. 1 is a side view of a portion of the blade of a circular saw, showing my improved insertable saw tooth in position;

Fig. 2 is a sectional view on the line 2—2, Fig. 1;

Fig. 3 is a perspective view of the tooth;

Fig. 4 is a front edge view of the tooth;

Fig. 5 is a detached perspective view of the retainer; and

Fig. 6 is a diagram.

1 is the body of a circular saw in the present instance, having a recess 2 for the tooth 3 and the retainer 4. The tooth has a cutting edge 5 and a curved back 6 in which is a V-shaped groove 7 fitting the V-shaped rib 8 on the curved wall 9 of the saw blade. The tooth in the present instance has a shoulder 10 which is preferably parallel with the part of the wall 11 at the periphery of the blade but there is a slight clearance between the two parts to allow the tooth to seat against the blade at 13. The lower portion of the tooth is curved as at 12, and has a flat portion 12a fitting a flat seat 13 of the blade, so that when the tooth is in position it accurately fits the recess in the blade and the thrust is taken by the seat 13. The front of the tooth has a recess 14 forming part of the gullet 15 of the saw and beyond this recess are two similar recesses 16 and 17 into which extend the like projections 18 and 19 of the retainer 4, and between the two projections 18 and 19 in the present instance is a slot 20 to allow each projection to yield slightly to accommodate itself to the recesses in the tooth.

The retainer 4 has a V-shaped groove 21 which fits a V-shaped rib 22 on the body of the saw, so as to hold the retainer in alignment with the blade.

In order to prevent any lateral movement of the tooth in respect to the retainer and to lock it firmly in position, I provide means for locking the tooth to the retainer. This means consists in the present instance of a tongue or rib 23 projecting from the walls of the recess 17 of the tooth, which extends into a groove 24 in the projection 19 of the retainer. By this means the tooth is held firmly from any lateral movement by the rib 8 on the saw blade which extends into the groove in the back of the tooth, and the tongue 23 which extends into a groove in the retainer 4. This particular construction also provides a very firm means of locking the tooth to the blade.

In laying out the saw, the gullet is formed by a circle A taken from a center $a$. B is a radial line by the distance which cuts through the corner of the back of the tooth cavity near its outer edge as at 11. The center is then moved to the point $c$ and the radial line C is taken from the point 11 to the seat 13. This forms a cavity D between the radial line B and the radial line C directly under the point 11, so that when the tooth is forced to its seat by the movement of the holder 4, it passes the point 11, then is forced into the undercut cavity D to its seat, the holder yielding under pressure sufficient to allow the tooth to pass the point 11 and when the tooth is seated the holder expands, holding the tooth rigidly in position and it is impossible for the tooth to be released while working, as it rests in the undercut portion of the plate.

By providing the two recesses 16 and 17 at the base of the tooth and corresponding projections of the keeper, long bearings are formed between the tooth and the keeper, and the pressure when the keeper is forced into place is on the line $x$—$x$, Fig. 1.

The spring of the keeper tends to force projections 18 and 19 firmly against the tooth and the tooth in turn against the curved surface of the blade.

In some instances, the tongue 23 may be on the projection 19 and the groove 24 may be in the wall of the recess 17.

I claim:

The combination in an insertable tooth saw, of a body portion having a circular gullet recess therein, and having a rear wall offset on the same circular line but the center from which the rear wall is taken being moved back of the center of the gullet circle, to form a tapered recess for the tooth, having a seat at its lower end; a tooth located in the tapered recess of the blade, the inner end of the tooth resting upon the seat, said tooth having two recesses in its face; a retainer located in the circular gullet of the blade and having projections adapted to the recesses in the face of the tooth, said retainer being slotted between its two projections, permitting such projections to yield independently as the tooth is sprung into its seat; and a tongue-and-groove connection between one of the projections of the retainer and the tooth.

SAMUEL T. FREAS.